United States Patent [19]

King

[11] Patent Number: 6,101,922
[45] Date of Patent: Aug. 15, 2000

[54] CYLINDER

[75] Inventor: Jeffrey R. King, 13041 Wedel, Trufant, Mich. 49347

[73] Assignee: Jeffrey R. King, Trufant, Mich.

[21] Appl. No.: 09/063,662

[22] Filed: Apr. 21, 1998

[51] Int. Cl.[7] .............................. F01B 31/00; F16J 15/18
[52] U.S. Cl. ................................................ 92/164; 92/168
[58] Field of Search ....................... 92/163, 164, 165 R, 92/168

[56] References Cited

U.S. PATENT DOCUMENTS

| | | | |
|---|---|---|---|
| 2,677,933 | 5/1954 | Hopkinson | 92/128 X |
| 2,687,910 | 8/1954 | Petch et al. | 92/164 X |
| 2,839,218 | 7/1958 | Zerbe | 200/240 X |
| 2,890,917 | 6/1959 | Prince | 92/168 |
| 2,952,480 | 9/1960 | Prill et al. | 220/319 X |
| 3,168,853 | 2/1965 | Prince . | |
| 3,437,230 | 4/1969 | Savory . | |
| 3,474,710 | 10/1969 | Stryker | 92/128 |
| 3,494,652 | 2/1970 | Langland . | |
| 3,650,182 | 3/1972 | Phillips . | |
| 3,986,635 | 10/1976 | Niskin | 220/319 |
| 4,357,858 | 11/1982 | Wedman | 92/164 X |
| 4,496,071 | 1/1985 | Stewart | 220/319 |
| 4,671,169 | 6/1987 | Hillier | 92/164 X |
| 4,771,678 | 9/1988 | Walker | 92/128 |
| 4,790,341 | 12/1988 | Laurel | 137/15 |
| 5,245,911 | 9/1993 | Yuda | 92/128 |
| 5,355,774 | 10/1994 | Ditlinger | 92/128 |
| 5,357,847 | 10/1994 | Stewart | 92/163 X |
| 5,400,695 | 3/1995 | Walker | 92/128 |
| 5,669,284 | 9/1997 | Fish . | |

Primary Examiner—John E. Ryznic
Attorney, Agent, or Firm—Van Dyke, Gardner, Linn & Burkhart LLP

[57] ABSTRACT

A cylinder includes a cylindrical casing, a cap mounted to the cylindrical casing, a retaining member, and a piston rod assembly which is positioned in the interior of the cylindrical casing. The cylindrical casing includes a casing wall which extends along a longitudinal axis and defines an interior, an open end, and a closed end. The piston rod assembly includes a rod end and a piston, with the piston including at least one piston seal sealing against an inner surface of the casing wall, which divides the interior of the casing wall into first and second fluid reservoirs. The rod end of the piston rod assembly extends through the cap and moves between extended positions and retracted positions as a function of the pressures in the first and second reservoirs. The casing wall has a first annular groove adjacent the open end, and a first port, which is in fluid communication with the first fluid reservoir for delivering fluid to the first fluid reservoir, is provided in either the closed end or the casing wall. The cap includes a second port, which is in fluid communication with the second reservoir for delivering fluid to the second reservoir, and a second annular groove which is aligned with the first annular groove of the casing wall when the cap is mounted to the open end of the casing wall, thus defining a cavity therebetween. The retaining member is positioned in the cavity and limits the longitudinal movement of the cap with respect to the cylindrical casing and, yet, permits rotational movement of the cap with respect to the cylindrical casing about the longitudinal axis of the casing, thereby, permitting adjustment of the second port about the longitudinal axis of the cylindrical casing.

24 Claims, 5 Drawing Sheets

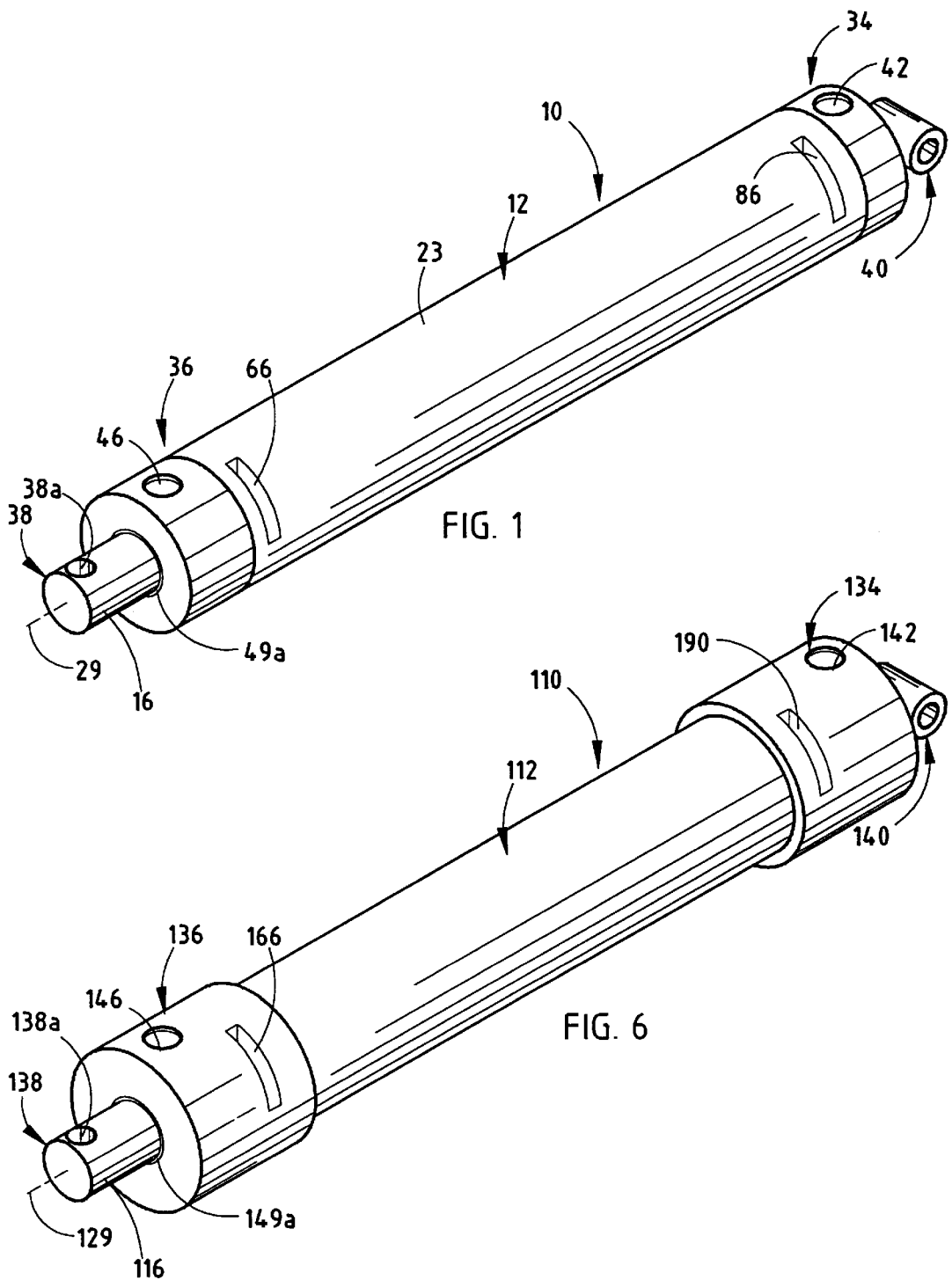

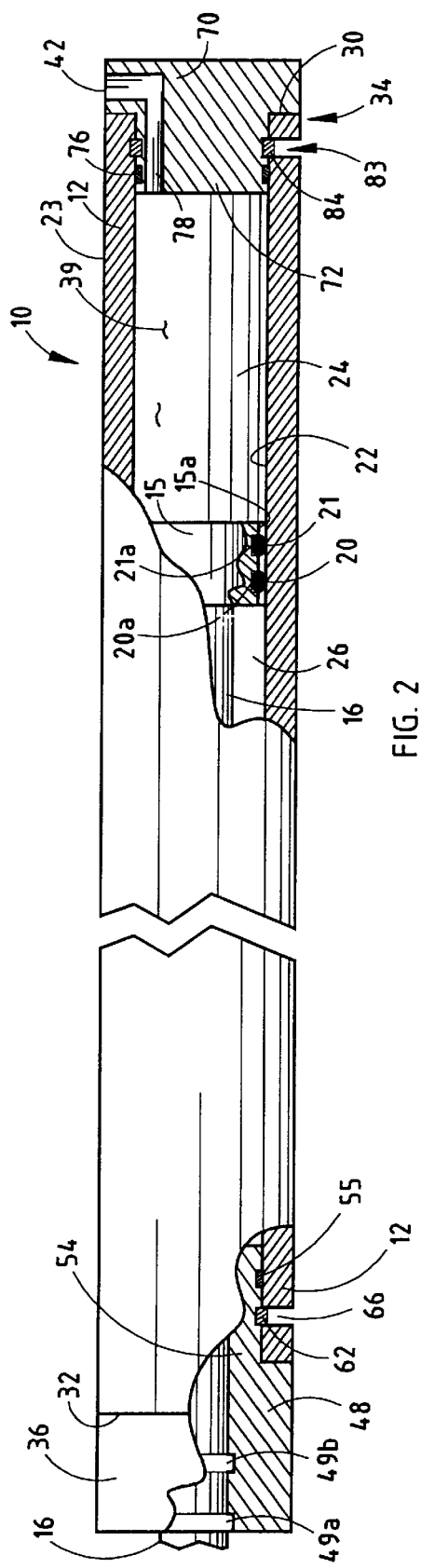
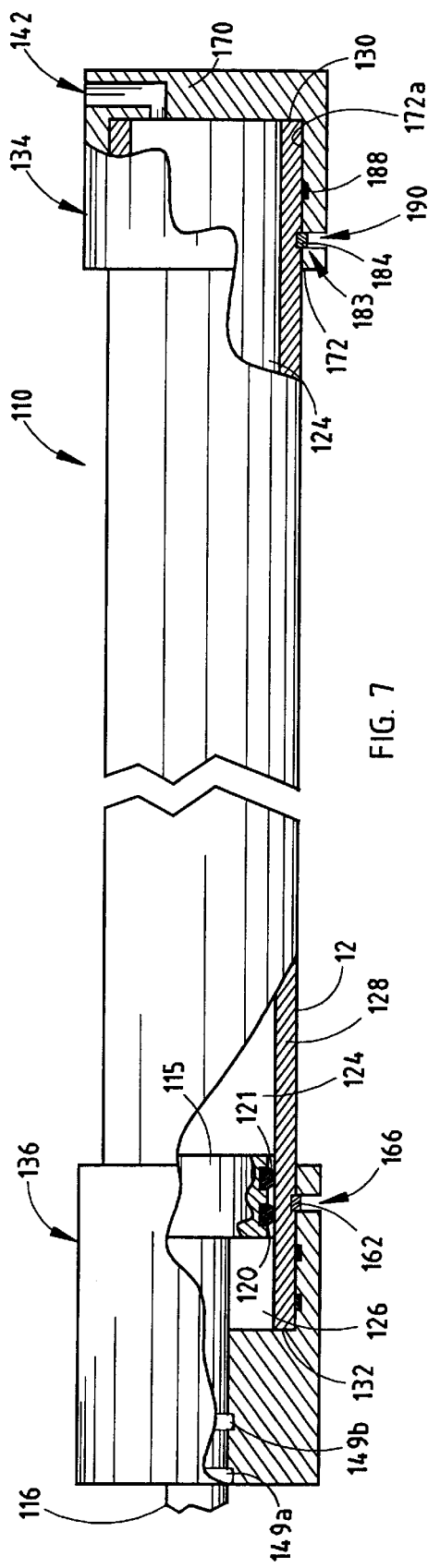

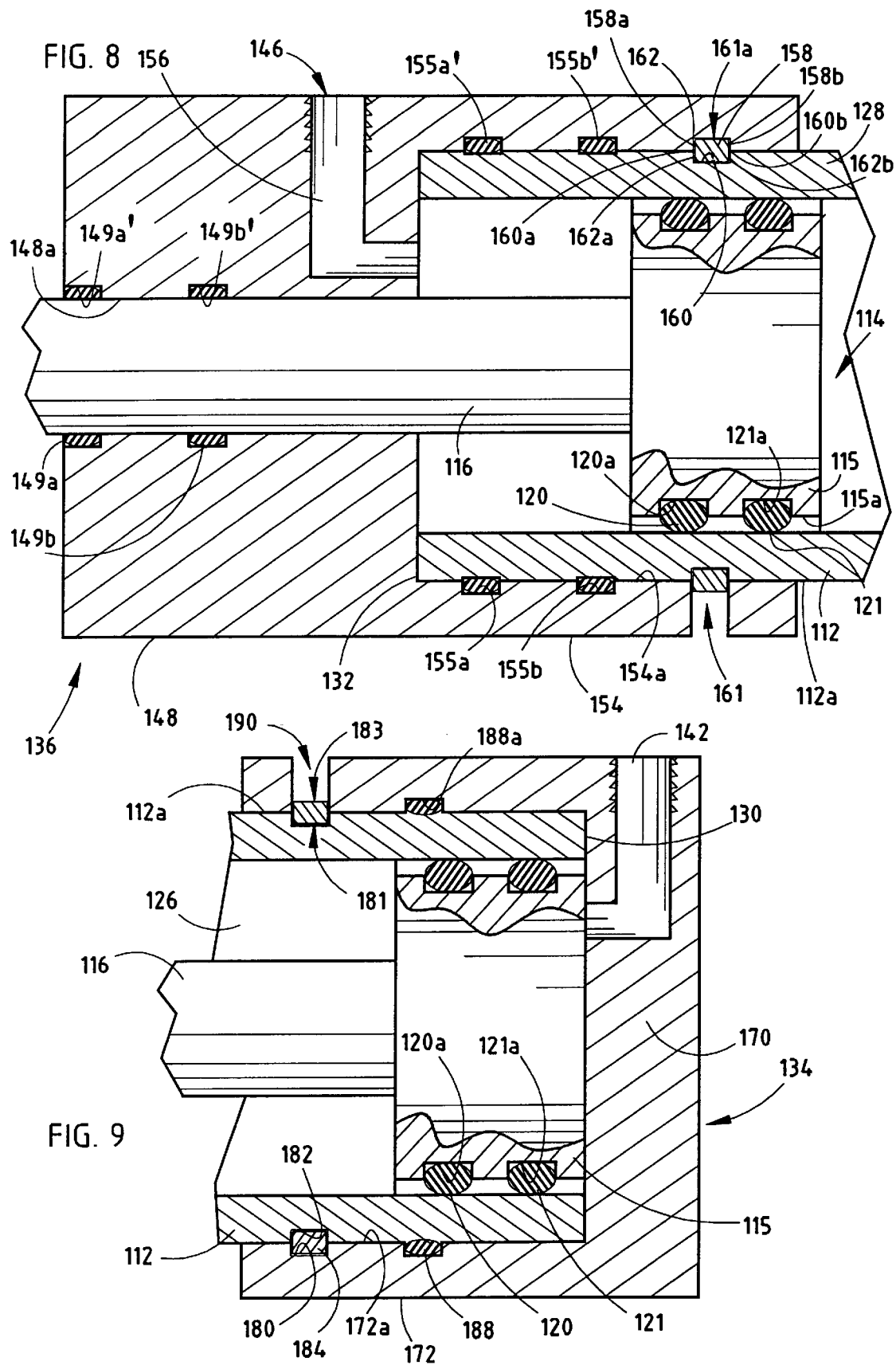

CYLINDER

TECHNICAL FIELD AND BACKGROUND OF THE INVENTION

The present invention relates to a cylinder and, more particularly, to a cylinder which can be easily adjusted to suit field conditions.

Cylinders have numerous applications and are often used in machines to move parts or provide lifting mechanisms. Typically, cylinders comprise a hollow outer cylindrical casing, which includes a closed end on one end of the casing and a removable end cap on an opposed end of the casing. A piston, which is mounted on a rod, is positioned in the cylindrical casing and includes a seal, which seals the space between the piston and the cylindrical casing. The free end of the rod extends through the removable end cap for connection to the machine. In a double acting cylinder, the piston divides the hollow interior of the cylindrical casing into two reservoir areas. Conventionally, in a double acting cylinder, the casing includes two ports—a first port which is in communication with the first reservoir, and a second port which is in communication with the second reservoir. In this manner, fluid, such as hydraulic fluid air, or air over oil, can be delivered to the respective reservoirs to apply pressure to the piston to move the piston and rod along the longitudinal axis of the hollow cylindrical casing. Thus, the free end of the piston, which extends through the end cap of the hollow cylindrical casing, extends or contracts in response to the pressures of the fluid in the reservoirs.

Typically, both ports are provided on the hollow casing wall. As a result, the relative positions of the two ports are fixed, which in some instances limits the application of the cylinders. Furthermore, by locating the ports in the casing, the overall length of the casing, and therefore the cylinder, is proportionately increased by the diameters of the ports. Again, as a result, in some applications the use of cylinders is precluded.

Proposals have been made to include a port in the base of a cylinder. For example, U.S. Pat. No. 2,890,917 to Prince and U.S. Pat. No. 3,494,652 to Langland each disclose double acting hydraulic cylinders with ends (32 and 26, respectively) which are held in place by snap rings and/or a retaining ring. In the Langland cylinder, the snap rings limit the movement in both left hand and right-hand directions. As a result, the positions of the ports 30 and 39 are fixed relative to each other, and removal of the snap rings is needed to permit adjustment.

Consequently, there is a need for a cylinder with adjustable ports to facilitate and simplify installation. Furthermore, there is a need for a cylinder which has a reduced length to increase its application. Furthermore, with reduced lengths, the overall weight and cost of equipment and machines employing such cylinders may be significantly reduced.

SUMMARY OF THE INVENTION

Accordingly, the present invention provides a new and improved cylinder, which includes an improved assembly that permits the ports which deliver fluid, such as hydraulic fluid, air, or air over oil, to the reservoirs of the cylinder to be adjusted without disassembly of the cylinder.

According to one aspect of the invention, a cylinder includes a cylindrical casing, a cap mounted to the cylindrical casing, a wire member, and a piston rod assembly which is positioned in the interior of the cylindrical casing. The cylindrical casing includes a casing wall which extends along a longitudinal axis and defines an interior, an open end, and a closed end. The piston rod assembly includes a rod end and a piston, with the piston including at least one piston seal sealing against an inner surface of the casing wall, which divides the interior of the casing wall into first and second reservoirs. The rod end of the piston rod assembly extends through the cap and moves between extended positions and retracted positions as a function of the pressures in the first and second reservoirs. The casing wall has a first annular groove adjacent the open end. A first port, which is in fluid communication with the first fluid reservoir for delivering fluid to the first fluid reservoir, is provided in either the closed end or the casing wall. The cap includes a second port, which is in fluid communication with the second reservoir for delivering fluid to the second reservoir, and a second annular groove which is aligned with the first annular groove of the casing wall when the cap is mounted to the open end of the casing wall, thus defining a cavity therebetween. The wire member is positioned in the cavity and limits the longitudinal movement of the cap with respect to the cylindrical casing and, yet, permits rotational movement of the cap with respect to the cylindrical casing about the longitudinal axis of the casing, thereby, permitting adjustment of the second port about the longitudinal axis of the cylindrical casing.

In one form, the cap includes a portion which extends into the second open end of the casing, with the first annular groove being formed on an inner surface of the casing wall, and the second annular groove being formed on an outer surface of the portion. Alternately, the second end of the cylindrical casing extends into the cap, with the first annular groove being formed on an outer surface of the casing wall, and the second annular groove being formed on the inner surface of the cap.

In another form, a base member is secured to the casing wall which defines the closed end of the cylindrical casing. In other forms, the base member includes a third annular groove, and the casing wall includes a fourth annular groove which is aligned with the third annular groove to define a second cavity when the base member is mounted to the casing wall. Optionally, the second port is provided in base member which reduces the overall length of the cylinder. Preferably, a second wire member is positioned in the second cavity to secure the base member to the casing wall to limit longitudinal movement of the base member with respect to the casing wall while allowing rotational movement of the base member about the casing wall.

According to another aspect of the invention, the cylinder includes a cylindrical casing with a casing wall extending along a longitudinal axis and defining an interior with first and second opposed open ends. The casing wall includes an annular groove adjacent the second open end. A base member is secured to the first open end with one of the base member and the casing wall including a first port for delivering fluid into one of two fluid reservoirs in the interior of the cylindrical casing. A cap is mounted onto the second open end, which includes an annular collar and a second port for delivering fluid to the other of the two reservoirs in the interior of the casing. The annular collar includes a second annular groove, which is aligned with the annular groove of the casing wall when the cap is mounted to the second open end and defines a cavity therebetween. A retaining member is positioned in the cavity to thereby limit longitudinal movement of the cap with respect to the cylindrical casing and permit rotational movement of the cap about the cylindrical case and permit adjustment of the position of the second port about the longitudinal axis of the cylindrical casing. A piston rod assembly is positioned in the interior of the casing, which includes a rod end and a piston. The piston includes at least one piston seal sealing against an inner surface of the casing wall which divides the interior into first and second fluid reservoirs, with the first port being in fluid communication with the first reservoir, and the second port being in fluid communication with the second reservoir. The rod end extends through the cap and moves between extended and retracted positions as a function of the fluid pressures in the first and second fluid reservoirs.

In one form, the first port is located in the base member, which thereby reduces the overall length of the cylinder.

In other forms, the retaining member is a generally rectangular cross-section wire member.

According to yet another aspect of the invention, a cylinder includes a cylindrical casing which includes a casing wall and a longitudinal axis. The casing wall defines an interior and first and second opposed open ends and has a first annular groove adjacent the first open end and a second annular groove adjacent the second open end. A base member is mounted to the first open end of the cylindrical casing which includes a third annular groove and a first seal for sealing against the casing wall and a first port for delivering fluid into one of two fluid reservoirs in the interior of the cylindrical casing. The third annular groove aligns with the first annular groove on the casing wall when the base member is mounted to the first open end and defines a first cavity therebetween. A cap is mounted to the second open end of the cylindrical casing and includes a second port and an annular collar. The annular collar includes a fourth annular groove and a second seal sealing against the casing wall. The fourth annular groove aligns with the second annular groove of the casing wall when the cap is mounted to the second open end and defines a second cavity therebetween. First and second retaining members are respectively positioned in the first and second cavities to thereby limit longitudinal movement of the base member and the cap, respectively, with respect to the casing wall and permit rotational movement of the base member and the cap, respectively, about the casing wall. Furthermore, the retaining members permit independent adjustment of the respective positions of the first and second ports about the longitudinal axis of the cylindrical casing. A piston rod assembly is positioned in the interior of the casing wall, which includes a rod end and a piston, with the piston including at least one piston seal sealing against the inner surface of the casing wall. The piston divides the interior of the casing wall into first and second reservoirs, with the first port being in fluid communication with the first reservoir, and the second port being in fluid communication with the second reservoir. The rod end extends through the cap and moves between extended and retracted positions as a function of fluid pressures and the respective reservoirs.

In one form, at least one of the first port and second port is recessed in the base member or the cap, respectively. In other forms, the cap includes a portion which extends into the second open end of the casing wall, with the portion including the fourth annular groove and the cap seal for sealing against the casing wall. In yet other forms, the base member includes a portion extending into the first open end of the casing wall, with the portion including the fourth annular groove and the base seal for sealing against the casing wall. Preferably, one of the cap and the casing wall includes a slotted opening for inserting the first or second wire into the first or second cavity, respectively.

As will be understood, the cylinder of the present invention provides several advantages over prior known cylinders. The cylinder permits adjustment of one or more ports about a longitudinal axis of the cylinder to accommodate various installations and field conditions. Furthermore, by locating the ports in the pressure plate and/or gland nut, the overall length the cylinder can be reduced and, thus, increase the application of the cylinder. These and other objects, advantages, purposes and features of the invention, will become more apparent from the study of the following description taken in conjunction with the drawings.

DESCRIPTION OF THE DRAWINGS

FIG. 1 is a perspective view of a first embodiment of the cylinder of the present invention;

FIG. 2 is an exploded perspective view of the cylinder of FIG. 1;

FIG. 6 is a perspective view of a second embodiment of the cylinder of the present invention;

FIG. 7 is a partial fragmentary view of the cylinder of FIG. 6;

FIG. 8 is a cross-sectional view taken along line VIII—VIII of FIG. 7; and

FIG. 9 is a cross-sectional view taken along line IX—IX of FIG. 7.

DESCRIPTION OF THE PREFERRED EMBODIMENTS

Figure 3:
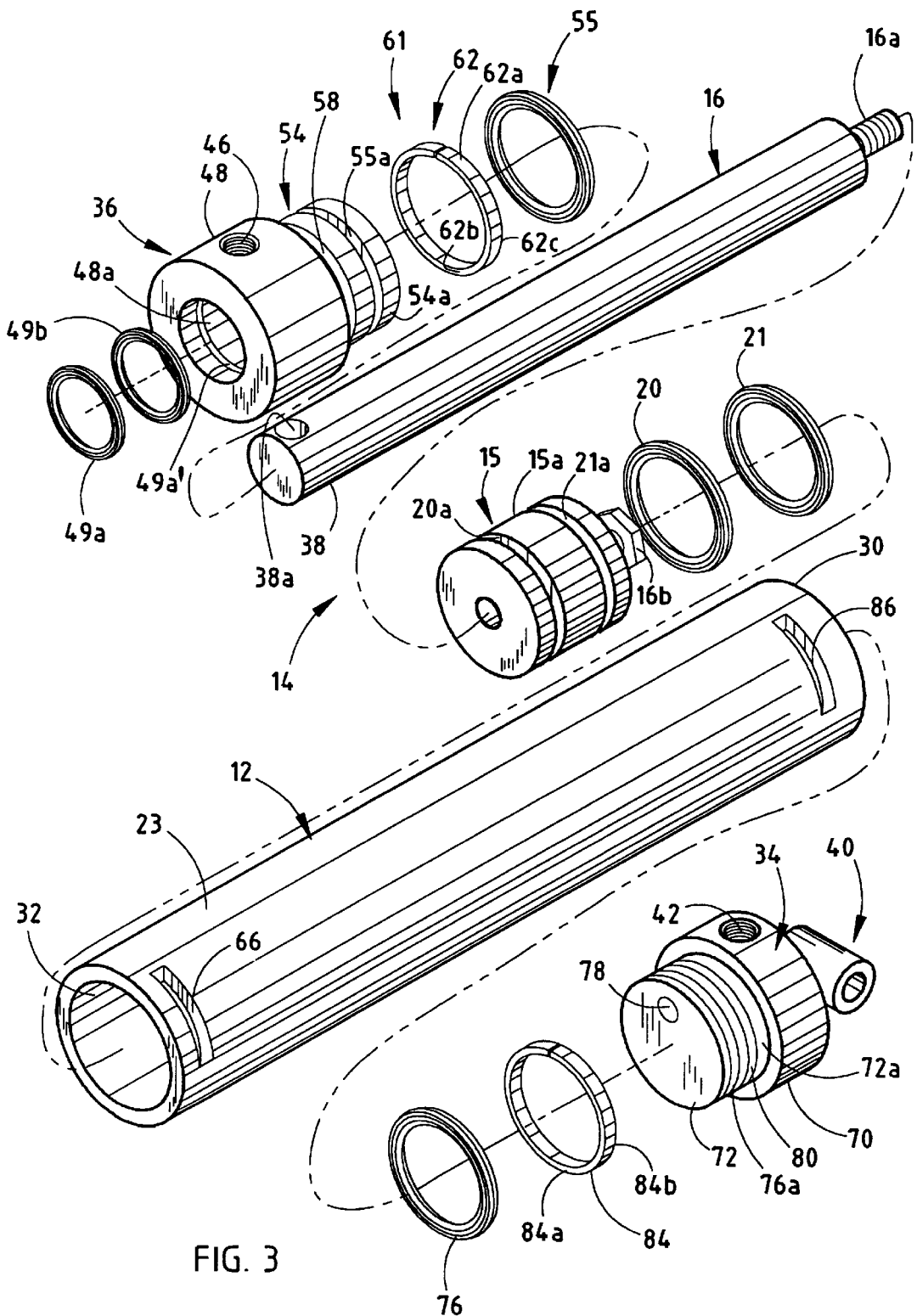
FIG. 3 is a partial fragmentary side view of the cylinder of FIG. 1.

Referring to FIGS. 1–3, the numeral 10 generally designates a double acting cylinder of the present invention. Cylinder 10 includes a hollow tubular or cylindrical metal casing 12 and a piston rod assembly 14. Piston rod assembly 14 includes a metal piston 15 mounted onto a threaded portion 16a of a metal rod 16 by a nut 16b, which is preferably at least partially recessed in the piston 15. Rod 16 extends through casing 12 and projects from casing for coupling to a component or a part of a machine, as will be more fully described below. Piston 15 is positioned in the interior of hollow cylindrical casing 12 and includes one or more annular seals 20 and 21, which are positioned or mounted in respective grooves 20a and 21a provided on outer surface 15a of piston 15. Seals 20 and 21 seal piston 15 against the interior surface 22 of cylindrical casing wall 23 of casing 12 to thereby define two fluid reservoirs 24 and 26 in the interior of casing 12.

Casing 12 includes first and second opposed open ends 30 and 32, which are aligned and spaced along a longitudinal axis 29 of casing 12. First open end 30 is closed by a pressure plate 34, which is mounted to first end 30 as will be more fully described below. Similarly, second open end 32 is closed by an end cap or gland nut 36, which is mounted to second open end 32, which will also be more fully described below. The rod end 38 of rod 16 extends through end cap or gland nut 36 and includes a transverse aperture 38a for receiving a bolt or pin for attachment to a component or a part of a machine or the like. Pressure plate 34 includes a tubular coupler 40 for fixing the base end of cylinder 10, as would be understood by those having ordinary skill in the art. Rod end 38 moves between extended positions and retracted positions for applying compressive and tension forces, respectively, in response to fluid pressures in fluid reservoirs 24 and 26.

Fluid 39, such as hydraulic fluid, air, or air over oil, is introduced into first fluid reservoir 24 through a first threaded port 42, which is preferably provided in pressure plate 34. However, it should be understood that first port 42 may be optionally located in casing wall 23. Similarly, fluid 39 is introduced into second reservoir 26 through a second threaded port 46, which is preferably provided in end cap or gland nut 36. In this manner, the position of piston 15 is varied by the fluid pressure of the fluid in reservoirs 24 and 26 which is controlled through fluid injected or withdrawn through ports 42 and 46.

Figure 4:
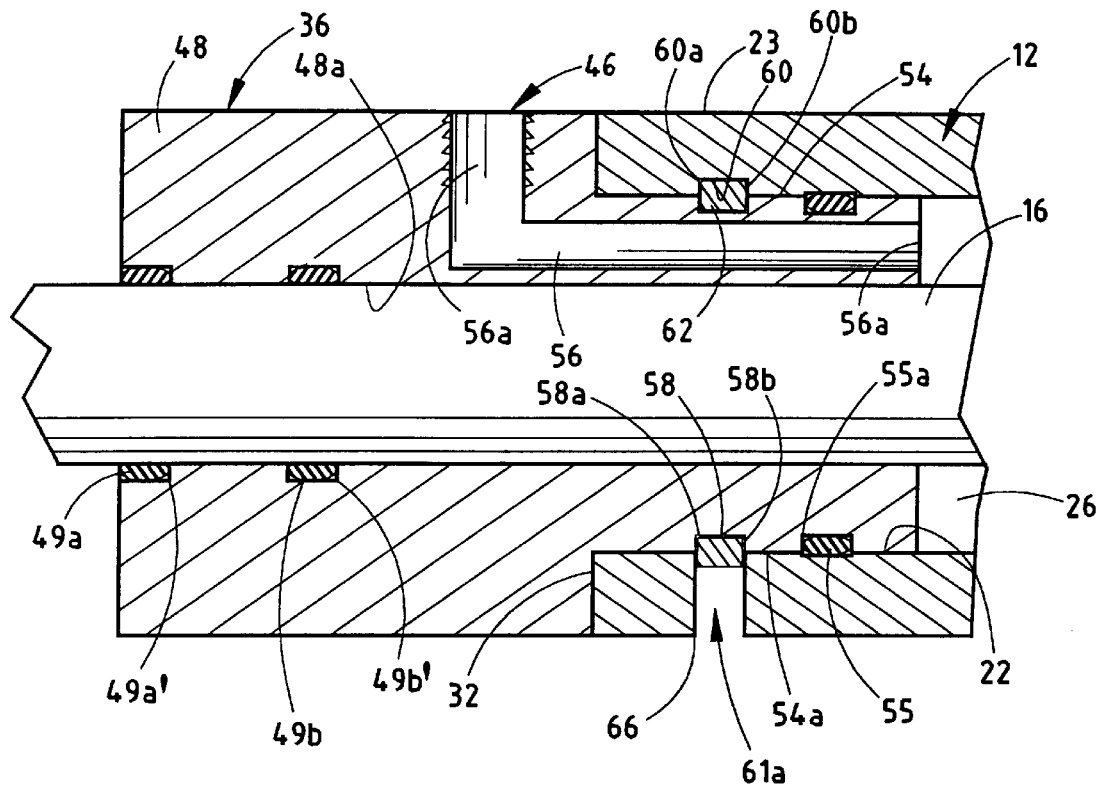
FIG. 4 is a cross-sectional view taken along line IV—IV of FIG. 3.

As best seen in FIG. 4, gland nut 36 includes an annular cylindrical base member 48 with an outer diameter which is generally commensurate in size with the outer diameter of cylindrical casing 12. Cylindrical base member 48 includes a transverse passage 48a and an annular cylindrical collar 54 which extends inwardly into second open free end 32 of cylindrical casing 12. Rod 16 extends from piston 15 through transverse passage 48a to move between extended and retracted positions to apply compressive and tension forces, respectively, as is understood by those having ordinary skill in the art. In order to provide a fluid tight seal, annular cylindrical collar 54 includes at least one annular seal or O-ring 55 on its outer surface 54a, which is positioned in a groove 55a and seals against the inner surface 22 of casing 12. Additionally, positioned in transverse passageway 48a are two longitudinally spaced annular seals or O-rings 49a and 49b which are respectively positioned in grooves 49a' and 49b' and seal against rod 16.

As described above, gland nut 36 includes second port 46 which is preferably recessed and extends inwardly into cylindrical member 48. Port 46 is in fluid communication with second reservoir 26 through a passageway 56 which extends from port 46 through cylindrical member 48 and through annular cylindrical collar 54. Passageway 56 includes an inlet opening 56a, which is in communication with port 46, and an outlet opening 56b, which is in communication with second reservoir 26. In addition, annular collar member 54 includes an annular groove or slot 58 which is positioned along longitudinal axis 36a of gland nut 36 between groove 55a and annular cylindrical member 48. Similarly, inner surface 22 of cylindrical casing 12 includes a corresponding annular slot or groove 60 which aligns with slot 58 of gland nut 36 such that when gland nut 36 is inserted into second open end 32 of cylindrical casing 12, grooves 60 and 58 align and define a cavity 61 therebetween.

Referring to FIGS. 2–4, a retaining member 61 is inserted and positioned in cavity 61 between grooves 58 and 60 of gland nut 36 and casing 12, respectively. Retaining member 61 preferably comprises a wire member 62 and, more preferably, a wire member with a generally rectangular solid cross-section, which substantially fills cavity 61a formed by the aligned grooves 58 and 60 so that wire member 62 limits relative longitudinal movement of gland nut 36 with respect to casing 12 and retains gland nut 36 on casing 12. However, wire member 62 does not limit relative rotational movement of gland nut 36 with respect to casing 12 and, therefore, permits rotation of gland nut 36 about longitudinal axis 29 of casing 12. Thus, the position of second port 42 may be easily adjusted 360° about longitudinal axis 29 of casing 12.

Wire member 62 is installed in cavity 61a through a slotted opening 66 provided on casing wall 23, which includes a longitudinal extent which extends around the circumference of casing wall 23. A first end 62a of wire member 62 is inserted into casing 12 through opening 66 and pushed into cavity 61a via opening 66 until first end 62a of wire member 62 extends around annular cavity 61a formed between slots 58 and 60. In this manner, opposed sides 62b and 62c of wire member 62 abut or bear against the respective side walls 58a and 58b and 60a and 60b of grooves 58 and 60 to restrict relative longitudinal movement of gland nut 36 and casing 12. However, grooves 58 and 60 provide annular guide surfaces for wire member 62 and, thus, permit gland nut 36 to rotate on casing 12 over a range of 360° about longitudinal axis 29. Consequently, port 46 is freely positionable about longitudinal axis 29 of casing 12 to accommodate a wide variety of applications. Moreover, by locating port 46 in gland nut 36, the overall length of the cylinder 10 may be reduced by approximately the diameter of the port. A reduced cylinder length further increases the application of the cylinder and permits overall equipment dimensions to be reduced, which can significantly reduce the weight and cost of the equipment.

Figure 5:
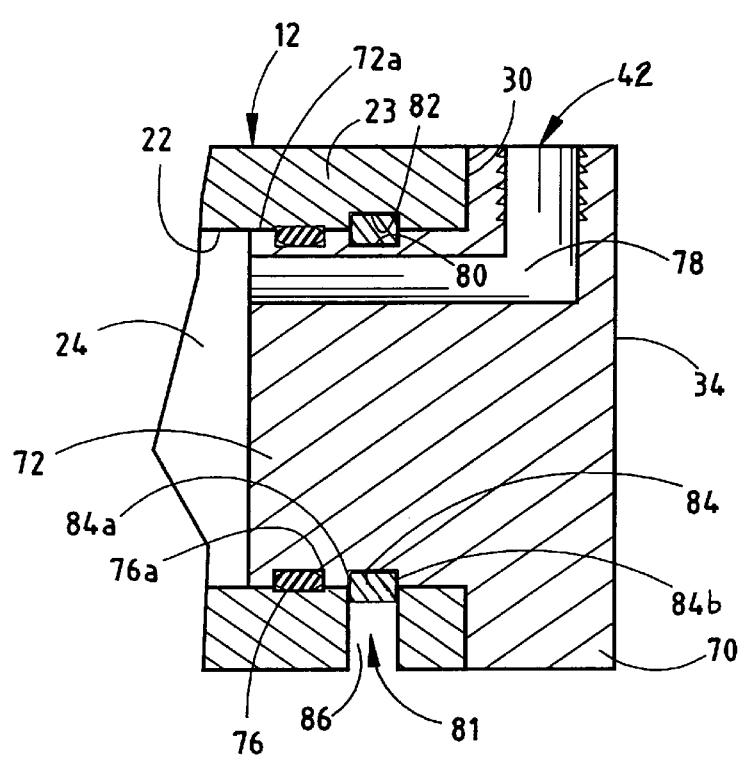
FIG. 5 is a cross-sectional view taken along line V—V of FIG. 3.

Referring to FIG. 5, pressure plate 34 includes a cylindrical base member 70 which has an outer diameter commensurate in size with the outer diameter of casing 12. Cylindrical base member 70 includes a central portion 72, which has an outer diameter commensurate in size with the inner diameter of casing 12 so that central portion 72 can be inserted into open end 30 of casing 12 thereby defining first reservoir 24. Positioned at or near the end 74 of central portion 72 is an annular seal or O-ring 76 which is preferably positioned in an annular groove 76a provided on outer surface 72a of central portion 72 and seals against the inner surface 22 of casing 12 for forming a fluid tight seal to seal first reservoir 24.

As described previously, pressure plate 34 includes port 42 for introducing fluid into first reservoir 24 of casing 12. Port 42 extends into cylindrical base member 70 and is preferably recessed in pressure plate 34. Port 42 communicates with reservoir 24 through a passageway 78 which extends from port 42 through base member 70 and through central portion 72 to reservoir 24. Similar to gland nut 36, pressure plate 34 includes an annular groove or slot 80, and inner surface 22 of casing 12 includes a corresponding annular groove or slot 82 which aligns with annular groove 80 of pressure plate 34 when central portion 72 is inserted into first open end 30 of casing 12. Positioned in the cavity 81, defined by grooves 80 and 82, is a second retaining member 83. Preferably, retaining member 83 comprises a wire member 84 and, more preferably, a wire member with a rectangular cross-section. Similar to wire member 62, wire member 84 includes opposed sides 84a and 84b which abut the respective sides 80a and 80b and 82a and 82b of grooves 80 and 82, respectively, to limit the relative longitudinal movement of pressure plate 34 with respect to casing 12 and thereby secure pressure plate 34 to casing 12. However, grooves 80 and 82 provide annular guides for wire member 84 and permit 360° rotation of pressure plate 34 on casing 12. Thus, the position of port 42 is easily adjusted about longitudinal axis 29 of cylindrical casing 12. In this manner, both ports 42 and 46 are adjustable 360° about longitudinal axis 29 of casing 12 which permits broader application and simpler installation than conventional cylinders. Furthermore, the overall length of cylinder 10 is further reduced by the diameter of second port 42. Moreover, with recessed ports, the likelihood of injury associated with handling cylinders with projecting ports is essentially eliminated. Similar to the first embodiment, wire member 84 is inserted into cavity 81 by way of a second slotted opening 86 provided in casing wall 23. Wire member 84 is of similar construction to wire member 62 and, therefore, reference is made thereto for further details.

Referring to FIG. 6, a second embodiment 110 of a double acting cylinder is illustrated. Cylinder 110 includes a hollow tubular or cylindrical casing 112 and a piston rod assembly 114 which is positioned in the interior of hollow cylindrical casing 112. Piston rod assembly 114 includes a piston 115 and a rod 116 with a rod end 138, which extends from casing 12, as will be more fully described below. Piston 115 includes one or more annular seals 120 and 121 which are positioned in respective grooves 120*a* and 121*a* provided on outer surface 115*a* of piston 115 and which seal piston 115 against the interior surface 122 of cylindrical casing 112 to thereby define to first and second fluid reservoirs 124 and 126 in interior of casing 112.

Referring to FIG. 7, cylindrical casing 112 includes a casing wall 128 which extends along a longitudinal axis 129 of cylindrical casing 112. Casing wall 128 defines first and second open ends 130 and 132 which are respectively closed by a pressure plate 134 and a cap or gland nut 136. Rod end 138 of rod 116 extends through cap or gland nut 136 and includes a transverse aperture 138*a* for receiving a bolt or load pin for attachment to a component or a part of a machine, or the like. Similarly, mounted to pressure plate 134 is a tubular coupler 140 for receiving a bolt or a load pin for securing the second end of cylinder 110. Fluid is introduced into first reservoir 124 through a first port 142, which is preferably provided in pressure plate 134. Similarly, fluid is introduced into second reservoir 126 through a second port 146, which is provided in end cap or gland nut 136. As fluid is introduced into first and second reservoirs 124 and 126, the position of piston 114 is varied as function of the differential pressures of fluid in reservoirs 124 and 126 which causes rod end 138 to move between extended and retracted positions for applying compressive or tension forces, as is known in the art.

Referring to FIG. 8, gland nut 136 comprises a cylindrical member 148 with a projecting annular collar 154 which defines a receptacle for receiving second open end 132 of cylindrical casing 112. Cylindrical member 148 includes a transverse passage 148*a* through which rod 116 extends for coupling to a component or a part of a machine or the like as described in reference to the first embodiment. Inner wall 154*a* of annular collar 154 includes a first annular groove or slot 158, which aligns with a second groove 160, which is provided on outer surface 112*a* of cylindrical casing 112 to thereby define a cavity 161*a*. Similar to the first embodiment, a retaining member 161 is positioned in cavity 161*a* through a slotted recess 166 provided in gland nut 136 to couple gland nut 136 to cylindrical casing 112 in a manner that limits longitudinal movement of gland nut 136 with respect to cylindrical casing 112 and yet permits rotational movement of gland nut 136 about longitudinal axis 129 of cylindrical casing 112. Preferably, retaining member 161 comprises a wire member 162 and, more, preferably, a wire member with a rectangular cross-section which includes opposed sides 162*a* and 162*b* for abutting or bearing on the respective side walls 158*a* and 158*b* and 160*a* and 160*b* of grooves 158 and 160, respectively. Thus, grooves 158 and 160 define stops which limit the longitudinal movement of gland nut 136 with respect to casing 112 and define annular guides to permit relative rotation.

As described above, gland nut 136 includes second port 146 which is preferably recessed in gland nut 136 and is in fluid communication with a passageway 156, which extends from port 146 through gland nut 136 to second reservoir 126. In this manner, repositioning of gland nut 136 permits repositioning of port 146 about the longitudinal axis 129 of cylindrical casing 112. Furthermore, by locating the port in the gland nut, the overall dimensions of the cylinder may be reduced by the diameter of the port.

Again referring to FIG. 8, gland nut 136 includes one or more annular seals or O-rings 155*a* and 155*b* which are provided on inner surface 154*a* of annular collar 154. Preferably, annular seals or O-rings 155*a* and 155*b* are positioned in corresponding grooves 155*a'* and 155*b'* provided on inner surface 154*a* of collar 154. Additionally, positioned in passageway 136*a* of gland nut 136, are seals or O-rings 149*a* and 149*b* which are positioned in respective grooves 149*a'* and 149*b'* formed on the inner surface of passageway 148*a* and seal against rod 116.

As best seen in FIG. 9, pressure plate 134 comprises a collar shape member having a base member 170 and a projecting cylindrical wall 172, which defines a cavity for receiving first end 130 of cylindrical casing 112. Preferably, base member 170 includes first port 142, which is in fluid communication with first reservoir 124 for introducing fluid into first reservoir 124. Pressure plate 134 is similarly coupled to the first end of cylindrical casing 112 by a second retaining member 183, for example a wire member 184. Inner surface 172*a* of cylindrical wall 172 includes a third annular groove or slot 180 which aligns with a corresponding annular groove or slot 182 provided on outer surface 112*a* adjacent first end 130 of cylindrical casing 112. Grooves 180 and 182 define therebetween a cavity 181 in which wire member 184 is inserted to couple pressure plate 134 to the first end of cylindrical casing 112. Wire member 184 is inserted into a second slotted opening 190 provided in cylindrical wall 172 of pressure plate 134 and is of a similar construction to wire members 62, 84, and 162 and, therefore, reference is made thereto for further details. Similar to wire member 84, wire member 184 limits the relative longitudinal movement of pressure plate 134 with respect to casing 112 and secures pressure plate 134 to casing 112 and yet permits rotation of pressure plate 134 on casing 112. Thus, wire member 184 permits repositioning of port 142 about longitudinal axis 129 of cylindrical casing 112. In this manner, both ports are adjustable 360° about longitudinal axis 129 of casing 112 to allow broader application and simpler installation sequences than conventional cylinders. Furthermore, as described in reference to the first embodiment, the overall length of cylinder 110 is further reduced by the diameter of second port 142.

In order to provide a fluid type cylinder 110, pressure plate 134 includes an annular or O-ring seal 188 which is positioned in an annular groove 188*a* provided on inner surface 172*a* of cylindrical wall 172 of pressure plate 134.

While several forms of the invention have been shown and described, other forms will now become apparent to the skilled in the art. For instance, one of the ports which provide communication to the reservoirs of the cylinder may be located on a cylindrical wall of the casing in a conventional manner. Although in the preferred embodiments ports 40, 42, 140, and 142 are recessed, ports that project outwardly from the outer surface of the gland nut and the pressure plate are also contemplated. Furthermore, the number of seals may be increased or decreased as desired provided a fluid type cylinder is achieved.

The embodiment of the invention shown in the drawings is not intended to limit the scope of the invention which is defined by the claims which follow.

The embodiments of the invention in which I claim exclusive property or privilege are defined as follows:

1. A cylinder comprising:

a cylindrical casing having a casing wall extending along a longitudinal axis and defining an interior, an open end, and a closed end, said casing wall having a first annular groove adjacent said open end, one of said closed end and said casing wall having a first port for delivering fluid into said interior of said casing wall;

a cap mounted to said open end, said cap including a second annular groove and a second port for delivering fluid into said interior of said casing wall, said second annular groove being aligned with said first annular groove of said casing wall when said cap is mounted to said open and defining a cavity therebetween;

a wire member positioned in said cavity, said wire member limiting longitudinal movement of said cap with respect to said cylindrical casing and being uncoupled to either of said cap or said casing and thus being unrestrained in said cavity and further permitting unrestrained 360° rotational movement of said cap with respect to said cylindrical casing about said longitudinal axis and, thereby, permitting adjustment of the position of said second port about said longitudinal axis of said cylindrical casing; and a piston rod assembly positioned in said interior of said casing, said piston rod including a rod end and a piston, said piston including at least one seal sealing against an inner surface of said casing wall, said piston dividing said interior into first and second fluid reservoirs, said first port being in fluid communication with said first reservoir, said second port being in fluid communication with said second reservoir, and said rod end extending through said cap moving between extended and retracted portions as a function of fluid pressures in said first and second fluid reservoirs.

2. The cylinder according to claim 1, wherein said second port is recessed in said cap.

3. The cylinder according to claim 1, wherein said cap includes a portion, said portion extending into said second open end of said casing, said first annular groove being formed on said inner surface of said casing wall, and said second annular groove being formed on an outer surface of said portion.

4. The cylinder according to claim 1, wherein said portion comprises an annular collar.

5. The cylinder according to claim 1, wherein said second end of said cylindrical casing extends into said cap, said first annular groove being formed on an outer surface of said casing wall, and said second annular groove being formed on an inner surface of said cap.

6. The cylinder according to claim 1, further comprising a base member secured to said casing wall, said base member defining said closed end.

7. The cylinder according to claim 6, further comprising a second wire member, wherein said base member includes a third annular groove, said casing wall including a fourth annular groove aligned with said third annular groove to define a second cavity when said base member is mounted to said casing wall, and said second wire member positioned in said second cavity to secure said base member to said casing wall, said second wire limiting longitudinal movement of said base member with respect to said casing wall and permitting rotational movement of said base member about said casing wall.

8. The cylinder according to claim 7, wherein said base member includes a portion, said collar extending into said casing wall and including said third annular groove.

9. The cylinder according to claim 8, wherein said portion of said base member comprises a cylindrical member.

10. A cylinder comprising:

a cylindrical casing having a casing wall extending along a longitudinal axis and defining an interior and first and second opposed open ends, said casing wall having a first annular groove adjacent said second open end;

a base member secured to said first open end, one of said base member and said casing wall including a first port;

a cap mounted onto said second open end, said cap including a second port and an annular collar, said annular collar including a second annular groove, said second annular groove being aligned with said first annular groove of said casing wall when said cap is mounted to said second open and defining a cavity therebetween;

a retaining member positioned in said cavity, said retaining member comprising an annular member with opposed free ends, said opposed free ends being enclosed in said cavity and being free of bends or projections, said retaining member limiting longitudinal movement of said cap with respect to said cylindrical casing and permitting unrestrained 360° rotational movement of said cap about said cylindrical casing and, thereby, permitting adjustment of the position of said second port about said longitudinal axis of said cylindrical casing; and a piston rod assembly positioned in said interior of said cylindrical casing, said piston rod assembly including a rod end and a piston, said piston including at least one seal sealing against an inner surface of said casing wall, said piston dividing said interior into first and second fluid reservoirs, said first port being in fluid communication with said first reservoir, said second port being in fluid communication with said second reservoir, and said rod end extending through said cap moving between extended and retracted portions as a function of fluid pressures in said first and second fluid reservoirs.

11. The cylinder according to claim 10, wherein said first port recessed in said base member.

12. The cylinder according to claim 10, wherein said second port is recessed in said cap.

13. The cylinder according to claim 10, wherein said annular collar extends into said second open end of said casing, said first annular groove being formed on said inner surface of said casing wall, and said second annular groove being formed on an outer surface of said annular collar.

14. The cylinder according to claim 10, wherein said second end of said cylindrical casing extends into said annular collar of said cap, said first annular groove being formed on an outer surface of said casing wall, and said second annular groove being formed on an inner surface of said annular collar.

15. The cylinder according to claim 10, wherein said retaining member comprises a wire member having a generally rectangular cross-section.

16. The cylinder according to claim 10, wherein one of said casing wall and said annular collar has a slotted opening for inserting said retaining member into said cavity.

17. A cylinder comprising:

a cylindrical casing having a casing wall and a longitudinal axis, said casing wall defining an interior and first and second opposed open ends, said casing wall having a first annular groove adjacent said first open end and a second annular groove adjacent said second open end;

a base member mounted to said first open end, said base member having a third annular groove and a first seal sealing against said casing wall, said third annular groove aligning with said first annular groove when said base is mounted to said first open end and defining a first cavity therebetween, and said base member including a first port for delivering fluid into said interior of said casing wall;

a cap mounted to said second open end, said cap including a second port for delivering fluid into said interior of said casing wall, a fourth annular groove, and a second seal sealing against said casing wall, said fourth annular groove aligning with said second annular groove of said casing wall when said cap is mounted to said second open and defining a second cavity therebetween;

a first retaining member positioned in said first cavity, said first retaining member limiting longitudinal movement of said base member with respect to said casing wall and permitting unrestrained rotational movement of said base member about said casing wall and, thereby, permitting adjustment of the position of said first port about said longitudinal axis of said cylindrical casing;

a second retaining member positioned in said second cavity to thereby limit longitudinal movement of said cap with respect to said cylindrical casing and permit unrestrained rotational movement of said cap about said cylindrical casing and adjustment of the position of said second port about said longitudinal axis of said cylindrical casing, at least one retaining member of said first retaining member and said second retaining member comprising a discontinuous annular member having opposed free ends, said free ends being free of bends or projections, and said at least one retaining member being uncoupled to either of said base member and said casing wall; and a piston rod assembly positioned in said interior of said casing, said piston rod assembly including a rod end and a piston, said piston including at least one piston seal sealing against an inner surface of said casing wall, said piston dividing said interior into first and second fluid reservoirs, said first port being in fluid communication with said first reservoir, said second port being in fluid communication with said second reservoir, and said rod end extending through said cap and moving between extended and retracted portions as a function of fluid pressures in said first and second fluid reservoirs.

18. The cylinder according to claim 17, wherein at least one of said first port and said second port is recessed in said base member and said cap, respectively.

19. The cylinder according to claim 17, wherein said cap includes a portion extending into said second open end of said casing wall, said portion including said fourth annular groove and said second seal.

20. The cylinder according to claim 17, wherein said base member includes a portion extending into said first open end of said casing wall, said portion including said third annular groove and said first seal.

21. The cylinder according to claim 17, wherein one of said cap and said casing wall includes a slotted opening for inserting said second retaining member into said second cavity.

22. The cylinder according to claim 17, wherein one of said base member and said casing wall includes a slotted opening for inserting said first retaining member into said first cavity.

23. The cylinder according to claim 17, wherein at least one of said first and second retaining members comprises a wire member.

24. The cylinder according to claim 17, wherein said cap is unrestrained about said longitudinal axis and is freely rotatable 360 degrees about said casing wall.

* * * * *

UNITED STATES PATENT AND TRADEMARK OFFICE
CERTIFICATE OF CORRECTION

| | |
|---|---|
| PATENT NO. | : 6,101,922 |
| DATED | : August 15, 2000 |
| INVENTOR(S) | : Jeffrey R. King |

Page 1 of 1

It is certified that error appears in the above-identified patent and that said Letters Patent is hereby corrected as shown below:

Column 1,
Line 24, insert -- , -- after the second occurrence of "fluid"

Signed and Sealed this

Twenty-fifth Day of December, 2001

Attest:

*Attesting Officer*

JAMES E. ROGAN
*Director of the United States Patent and Trademark Office*